US008332668B2

(12) United States Patent
Tupman et al.

(10) Patent No.: US 8,332,668 B2
(45) Date of Patent: *Dec. 11, 2012

(54) METHOD AND SYSTEM FOR DISCOVERING A POWER SOURCE ON A PERIPHERAL BUS

(75) Inventors: David John Tupman, San Francisco, CA (US); Ken Herman, San Jose, CA (US); Barry Twycross, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/004,721

(22) Filed: Jan. 11, 2011

(65) Prior Publication Data

US 2011/0107124 A1   May 5, 2011

Related U.S. Application Data

(60) Continuation of application No. 12/506,740, filed on Jul. 21, 2009, now Pat. No. 7,890,783, which is a division of application No. 11/031,288, filed on Jan. 7, 2005, now Pat. No. 7,581,119.

(60) Provisional application No. 60/608,959, filed on Oct. 8, 2004, provisional application No. 60/588,959, filed on Jul. 18, 2004.

(51) Int. Cl.
*G06F 1/26* (2006.01)

(52) U.S. Cl. ............ 713/300; 713/310; 713/340; 710/8; 710/14

(58) Field of Classification Search .................. 713/300, 713/310, 340; 710/8, 14
See application file for complete search history.

(56) References Cited

U.S. PATENT DOCUMENTS

| 4,257,098 A | 3/1981 | Lacy |
| 4,673,861 A | 6/1987 | Dubovsky et al. |
| 4,965,738 A | 10/1990 | Bauer et al. |
| 5,103,156 A | 4/1992 | Jones et al. |
| 5,150,031 A | 9/1992 | James et al. |

(Continued)

FOREIGN PATENT DOCUMENTS

EP   1139225 A1   10/2001

(Continued)

OTHER PUBLICATIONS

"A Serial Bus on Speed Diagram: Getting Connected with FireWire," downloaded Oct. 16, 2001, PC Magazine: PC Tech (A Serial Bus on Speed)   wysiwyg://51http://www.zdnet.com/pctech/content/18/10/tu1810.007.html p. 7. (2 pages).

(Continued)

*Primary Examiner* — Paul Yanchus, III
(74) *Attorney, Agent, or Firm* — Kilpatrick Townsend & Stockton LLP (57) ABSTRACT

Improved techniques to recognize a power source on a peripheral bus and/or determine power available from the power source via the peripheral bus are disclosed. Typically, the peripheral bus is supported by a cable connected between a host device and an electronic device. In this case, the host device is a power source (e.g., power adapter or battery pack) and the cable is used to provide power from the power source to the electronic device. Hence, by understanding the power available from the power source, the electronic device can manage its power utilization so as to operate in a stable and reliable manner. The electronic device is, for example, a portable computing device. Examples of portable computing devices include a Portable Digital Assistant (PDA) and a portable media player.

16 Claims, 11 Drawing Sheets

U.S. PATENT DOCUMENTS

| | | | |
|---|---|---|---|
| 5,371,456 | A | 12/1994 | Brainard |
| 5,402,055 | A | 3/1995 | Nguyen |
| 5,471,128 | A | 11/1995 | Patino et al. |
| 5,498,950 | A | 3/1996 | Ouwerkerk |
| 5,514,945 | A | 5/1996 | Jones |
| 5,602,455 | A | 2/1997 | Stephens et al. |
| 5,648,712 | A | 7/1997 | Hahn |
| 5,752,046 | A | 5/1998 | Oprescu et al. |
| 5,754,027 | A | 5/1998 | Oglesbee et al. |
| 5,783,926 | A | 7/1998 | Moon et al. |
| 5,845,217 | A | 12/1998 | Lindell et al. |
| 5,859,522 | A | 1/1999 | Theobald |
| 5,932,989 | A | 8/1999 | Thandiwe et al. |
| 5,955,869 | A | 9/1999 | Rathmann |
| 5,964,879 | A | 10/1999 | Dunstan et al. |
| 6,007,372 | A | 12/1999 | Wood |
| 6,025,695 | A | 2/2000 | Friel et al. |
| 6,087,804 | A | 7/2000 | Suda |
| 6,125,455 | A | 9/2000 | Yeo |
| 6,130,518 | A | 10/2000 | Gabehart et al. |
| 6,152,778 | A | 11/2000 | Dalton |
| 6,169,387 | B1 | 1/2001 | Kaib |
| 6,178,514 | B1 | 1/2001 | Wood |
| 6,184,655 | B1 | 2/2001 | Malackowski |
| 6,194,866 | B1 | 2/2001 | Olsson |
| 6,204,637 | B1 | 3/2001 | Rengan |
| 6,211,581 | B1 | 4/2001 | Farrant |
| 6,252,380 | B1 | 6/2001 | Koenck |
| 6,261,109 | B1 | 7/2001 | Liu et al. |
| 6,271,605 | B1 | 8/2001 | Carkner et al. |
| 6,283,789 | B1 | 9/2001 | Tsai |
| 6,316,916 | B2 | 11/2001 | Bohne |
| 6,353,894 | B1 | 3/2002 | Pione |
| 6,392,414 | B2 | 5/2002 | Bertness |
| 6,489,751 | B2 | 12/2002 | Small et al. |
| 6,526,516 | B1 | 2/2003 | Ishikawa et al. |
| 6,535,983 | B1 | 3/2003 | McCormack et al. |
| 6,567,007 | B1 | 5/2003 | Fritsche et al. |
| 6,597,565 | B1 | 7/2003 | Kluth et al. |
| 6,614,232 | B1 | 9/2003 | Mukai |
| 6,633,932 | B1 | 10/2003 | Bork et al. |
| 6,747,859 | B2 | 6/2004 | Walbeck et al. |
| 6,799,226 | B1 | 9/2004 | Robbin et al. |
| 6,936,936 | B2 | 8/2005 | Fischer et al. |
| 6,969,970 | B2 | 11/2005 | Dias et al. |
| 6,995,963 | B2 | 2/2006 | Fadell et al. |
| 7,054,981 | B2 | 5/2006 | Fadell et al. |
| 7,126,241 | B2 | 10/2006 | Popescu-Stanesti |
| 7,581,119 | B2 | 8/2009 | Tupman et al. |
| 7,890,783 | B2 | 2/2011 | Tupman et al. |
| 2001/0003205 | A1 | 6/2001 | Gilbert |
| 2001/0005641 | A1 | 6/2001 | Matsumoto et al. |
| 2001/0006884 | A1 | 7/2001 | Matsumoto |
| 2002/0156949 | A1 | 10/2002 | Kubo et al. |
| 2002/0169915 | A1 | 11/2002 | Wu |
| 2003/0052547 | A1 | 3/2003 | Fischer et al. |
| 2003/0076301 | A1 | 4/2003 | Tsuk et al. |
| 2003/0095096 | A1 | 5/2003 | Robbin et al. |
| 2003/0172312 | A1 | 9/2003 | Takahashi et al. |
| 2003/0205995 | A1 | 11/2003 | Odaohhara et al. |
| 2004/0117518 | A1 | 6/2004 | Fadell et al. |
| 2004/0225804 | A1 | 11/2004 | Leete |

FOREIGN PATENT DOCUMENTS

| | | |
|---|---|---|
| EP | 1487081 A2 | 12/2004 |
| JP | HEI108-152945 | 6/1996 |
| JP | 2001-069165 A | 3/2001 |
| JP | 2001-184146 A | 7/2001 |
| JP | 2001-344047 A | 12/2001 |
| JP | 2002-204276 A | 7/2002 |
| JP | 2002-328754 | 11/2002 |
| JP | 2003-044179 A | 2/2003 |
| JP | 2003-195985 A | 7/2003 |
| JP | 2004-166498 A | 6/2004 |
| KR | 2001-0096564 A | 11/2001 |
| WO | WO 99/26330 A2 | 5/1999 |
| WO | WO 00/39907 A2 | 7/2000 |
| WO | WO 03/073688 A1 | 9/2003 |

OTHER PUBLICATIONS

Belkin iPod Voice Recorder, Product Specification Sheet, printed Jun. 16, 2004. (2 pages).

Brentrup, "Introduction to Public Key Cryptography Demystified," Campus Technology, printed from http://www.campus-technology.com/article.asp?id=7626 on Oct. 6, 2004. (5 pages).

Brown, "Making USB Work," downloaded Oct. 16, 2001, PC Magazine: PC Tech wysiwyg:/155/http://www.zdnet.com/pcmag/pctech/content!18/04/tu1804.001.html (2 page).

"Cables to Go," download Oct. 16, 2001 http://www.cablestogo.com/product.asp?cat%5Fid=601&sku=27028 (1 page).

"ExpressBus™ F5U0I0," User Guide Packing Checklist, Belkin Components Product Warranty. (2 pages).

"FireWire", downloaded Oct. 16, 2001; wysiwyg://42/http://developer.apple.com/hardware/FireWire (2 pages).

"Fire Wire Connector," downloaded Oct. 16, 2001, wysiwyg://76/http://developer.apple.com/...es/Macintosh_CPUs-G3/ibook/ibook-27.html. (2 pages).

Fried, "FireWire poised to become ubiquitous," downloaded Oct. 16, 2001, CNET News.com, 1394 Trade Association: Press, wysiwyg:/132/http:/_113_94ta.org/Press/200_1_Press/august!8.2 7._b.html (5 pages).

Fried, "New Fire Wire to blaze faster trail," downloaded Oct. 16, 2001, CNET News.com, http://news.cnet.com/news/0-I006-200-6021210.html (5 pages).

"How to Connect Your Computer PC Hardware", downloaded Oct. 16, 2001, http:///www.scar.utoronto.ca!~ccweb/faculty/connect-howto.html (5 pages).

"IEEE 1394/USB Comparison," downloaded Oct. 16, 2001, www.genitech.com.auILIBRARY/TechSupportiinfobits/firewirevsusb.html (4 pages).

"Introduction to Public Key Cryptography," Oct. 9, 1998, printed from http://developer.netscape.com/docs/manuals/security/pkin/contents.html on Oct. 6, 2004. (21 pages).

Menezes et al., "Handbook of Applied Cryptography," *Identification and Entity Authentication*, Jan. 1, 1997, pp. 385-424. (41 pages).

Networking Tech Note, "1394 Standards and Specifications," 3 pgs.

"PMC FW2 IEEE1394 FireWire Controller", downloaded Oct. 16, 2001, http://www.bvmltd.co.uk/PMCfw2ds.html (10 pages).

Severance, "FireWire Finally Comes Home," Michigan State University, Standards, Nov. 1998, pp. 117-118 (2 pages).

Teener, "Understanding Fire Wire: The IEEE 1394 Standards and Specifications," downloaded Oct. 16, 2001, wysiwyg:119/http:1_lwww.chipcenter.com/networking/ieee_1394/main.html (5 pages).

Vitaliano, "Why FireWire is Hot!Hot!Hot!" downloaded Oct. 16, 2001, "Impact.FireWire.SideBar" http://www.vxm.com/21R.35.html (4 pages).

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm, (7 pages).

International Search Report in PCT application PCT/US05/024906, Mar. 15, 2006.

Search/Examination Report dated Jun. 18, 2010 from European Patent Application No. 10161779.3, 8 pages.

Search/Examination Report dated Aug. 4, 2010 from European Patent Application No. 05771312.5, 8 pages.

| HIGH VOLTAGE LEVEL | AVAILABLE POWER |
|---|---|
| $H_1$ | 1/2 W |
| $H_2$ | 1 W |
| $H_3$ | 3 W |
| ••• | --- |
| $H_n$ | 8 W |

FIG. 4A

| HIGH VOLTAGE LEVEL | AVAILABLE POWER |
|---|---|
| $H_1$ | 1 - AA |
| $H_2$ | 2 - AA |
| $H_3$ | 2 - AAA |
| ••• | --- |
| $H_n$ | 3 - AAA |

METHOD AND SYSTEM FOR DISCOVERING A POWER SOURCE ON A PERIPHERAL BUS

CROSS-REFERENCE TO RELATED APPLICATIONS

The present application is a continuation of U.S. patent application Ser. No. 12/506,740 filed Jul. 21, 2009, and entitled "METHOD AND SYSTEM FOR DISCOVERING A POWER SOURCE ON A PERIPHERAL BUS," which is a divisional application of U.S. Pat. No. 7,581,119, filed Jan. 7, 2005, and entitled "METHOD AND SYSTEM FOR DISCOVERING A POWER SOURCE ON A PERIPHERAL BUS", which claimed priority to U.S. Provisional Patent Application No. 60/608,959, filed Oct. 8, 2004, entitled "METHOD AND SYSTEM FOR DISCOVERING A POWER ADAPTER ON A PERIPHERAL BUS," and U.S. Provisional Patent Application No. 60/588,959, filed Jul. 18, 2004, entitled "METHOD AND SYSTEM FOR DISCOVERING A POWER ADAPTER ON A PERIPHERAL BUS," all of which are hereby incorporated herein by reference.

This application is also related to: (i) U.S. patent application Ser. No. 11/031,547, filed Jan. 7, 2005, entitled "PORTABLE POWER SOURCE TO PROVIDE POWER TO AN ELECTRONIC DEVICE VIA AN INTERFACE HIGHLY PORTABLE MEDIA DEVICE," which is hereby incorporated herein by reference; (ii) U.S. Provisional Patent Application No. 60/642,340, filed Jan. 7, 2005, entitled "ACCESSORY AUTHENTICATION FOR ELECTRONIC DEVICES," which is hereby incorporated herein by reference; (iii) U.S. patent application Ser. No. 11/031,301, filed Jan. 7, 2005, entitled "CONNECTOR SYSTEM," which is hereby incorporated herein by reference; (iv) U.S. patent application Ser. No. 10/833,689, filed Apr. 27, 2004, entitled "CONNECTOR INTERFACE SYSTEM FOR MULTI-COMMUNICATION DEVICE," which is hereby incorporated herein by reference; (v) U.S. patent application Ser. No. 10/278,752, filed Oct. 22, 2002, now U.S. Pat. No. 6,995,963, entitled "METHODS AND APPARATUS FOR CHARGING A BATTERY IN A PERIPHERAL DEVICE," which is hereby incorporated herein by reference; and (vi) U.S. patent application Ser. No. 10/125,893, filed Mar. 18, 2002, entitled "POWER ADAPTERS FOR POWERING AND/OR CHARGING PERIPHERAL DEVICES," which is hereby incorporated herein by reference.

BACKGROUND OF THE INVENTION

1. Field of the Invention

The present invention relates to electronic devices and, more particularly, to portable electronic devices that can couple to peripheral buses.

2. Description of the Related Art

Portable electronic devices, such as Portable Digital Assistants and media players, are often battery powered. These electronic devices sometimes also have peripheral bus ports that are able to support peripheral buses, such as Universal Serial Bus (USB) or FIREWIRE (IEEE 1394) bus ports. Peripheral buses are used to provide data communications with electronic devices as well as to provide limited amounts of power to the electronic devices.

Recently, the iPod®, a media player developed by Apple Computer, Inc. of Cupertino, Calif., has been able to charge its battery through power provided to its FIREWIRE bus port. Although charging batteries or otherwise powering an electronic device via a peripheral bus is convenient, peripheral buses are not designed to carry large amounts of power. In the case of a USB bus, the available power is limited to about 0.5 Watts but can be increased to about 2.5 Watts through a negotiation process. Unfortunately, not only is the negotiation process cumbersome, but the amount of power (even when increased through negotiation) is still often inadequate for many electronic devices.

Thus, there is a need to facilitate greater power delivery to electronic devices via peripheral buses.

SUMMARY OF THE INVENTION

Broadly speaking, the invention relates to improved techniques to recognize a power source on a peripheral bus and/or determine power available from the power source via the peripheral bus. Typically, the peripheral bus is supported by a cable connected between a host device and an electronic device. In this case, the host device is a power source (e.g., power adapter or battery pack) and the cable is used to provide power from the power source to the electronic device. Hence, by understanding the power available from the power source, the electronic device can manage its power utilization so as to operate in a stable and reliable manner. The electronic device is, for example, a portable computing device. Examples of portable computing devices include a Portable Digital Assistant (PDA) and a portable media player.

The invention can be implemented in numerous ways, including as a method, system, device, apparatus, or computer readable medium. Several embodiments of the invention are discussed below.

As an electrical device, one embodiment of the invention includes at least: a bus interface coupled to a bus connector, the bus connector providing a power line, a ground line and a plurality of data lines to the bus interface; an available power detector operatively connected to the bus interface, the available power detector operates to detect a level of available power from the power line when a power source is operatively connected to the bus interface via the bus connector; power-consuming circuitry; and a power manager operatively connected to the available power detector and the power-consuming circuitry, the power manager operates to manage power utilization by at least a portion of the power-consuming circuitry based on the level of available power.

As a method for managing power utilization by an electrical device having a bus connector, one embodiment includes at least the acts of: detecting connection of a peripheral bus to a bus connector of the electrical device, the peripheral bus having at least a power line and a plurality of bus data lines; reading voltage levels on the bus data lines when the detecting detects connection of the peripheral bus; determining whether a host device providing the peripheral bus is a power adapter based on the voltage levels; and determining an available power level for the power adapter based on the voltage levels when it is determines that the host device is a power adapter; and managing power utilization of the electrical device based on the available power level for the power adapter.

As a method for managing power utilization by an electrical device having a bus connector, another embodiment includes at least the acts of: detecting connection of a peripheral bus to a bus connector of the electrical device, the peripheral bus having at least a power line and a plurality of bus data lines; reading voltage levels on the bus data lines when said detecting detects connection of the peripheral bus; determining whether a host device providing the peripheral bus is a battery pack based on the voltage levels; and determining an available power capacity of the battery pack based on the voltage levels when it is determined that the host device is a battery pack; and managing power utilization of the electrical device based on the available power capacity of the battery pack.

As a method for determining power availability from a power adapter coupled to an electronic device via a peripheral bus, the peripheral bus having at least a power line and a plurality of bus data lines, one embodiment of the invention includes at least the acts of: reading voltage levels induced on the bus data lines by the power adapter; and determining an available power level for the power adapter based on the voltage levels.

As a method for determining power availability from a battery pack coupled to an electronic device via a peripheral bus, the peripheral bus having at least a power line and a plurality of bus data lines, another embodiment of the invention includes at least the acts of: reading voltage levels induced on the bus data lines by the battery pack; and determining an available power level for the battery pack based on the voltage levels.

As a method for identifying a peripheral device coupled to a peripheral connector of an electronic device, one embodiment of the invention includes at least the acts of: detecting connection of a peripheral bus to the bus connector of the electrical device, the peripheral bus being associated with a host device that is also connected to the peripheral bus, the peripheral bus having at least a power line and a plurality of bus data lines; reading voltage levels on the bus data lines after the detecting detects connection of the peripheral bus; and identifying the host device as a power adapter or battery pack based on the voltage levels.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques to recognize a power source on a peripheral bus and/or determine power available from the power source via the peripheral bus. Typically, the peripheral bus is supported by a cable connected between a host device and an electronic device. In this case, the host device is a power source (e.g., power adapter or battery pack) and the cable is used to provide power from the power source to the electronic device. Hence, by understanding the power available from the power source, the electronic device can manage its power utilization so as to operate in a stable and reliable manner. The electronic device is, for example, a portable computing device. Examples of portable computing devices include a Portable Digital Assistant (PDA) and a portable media player.

Embodiments of the invention are discussed below with reference to FIGS. 1A-10. However, those skilled in the art will readily appreciate that the detailed description given herein with respect to these figures is for explanatory purposes as the invention extends beyond these limited embodiments.

Figure 1A:
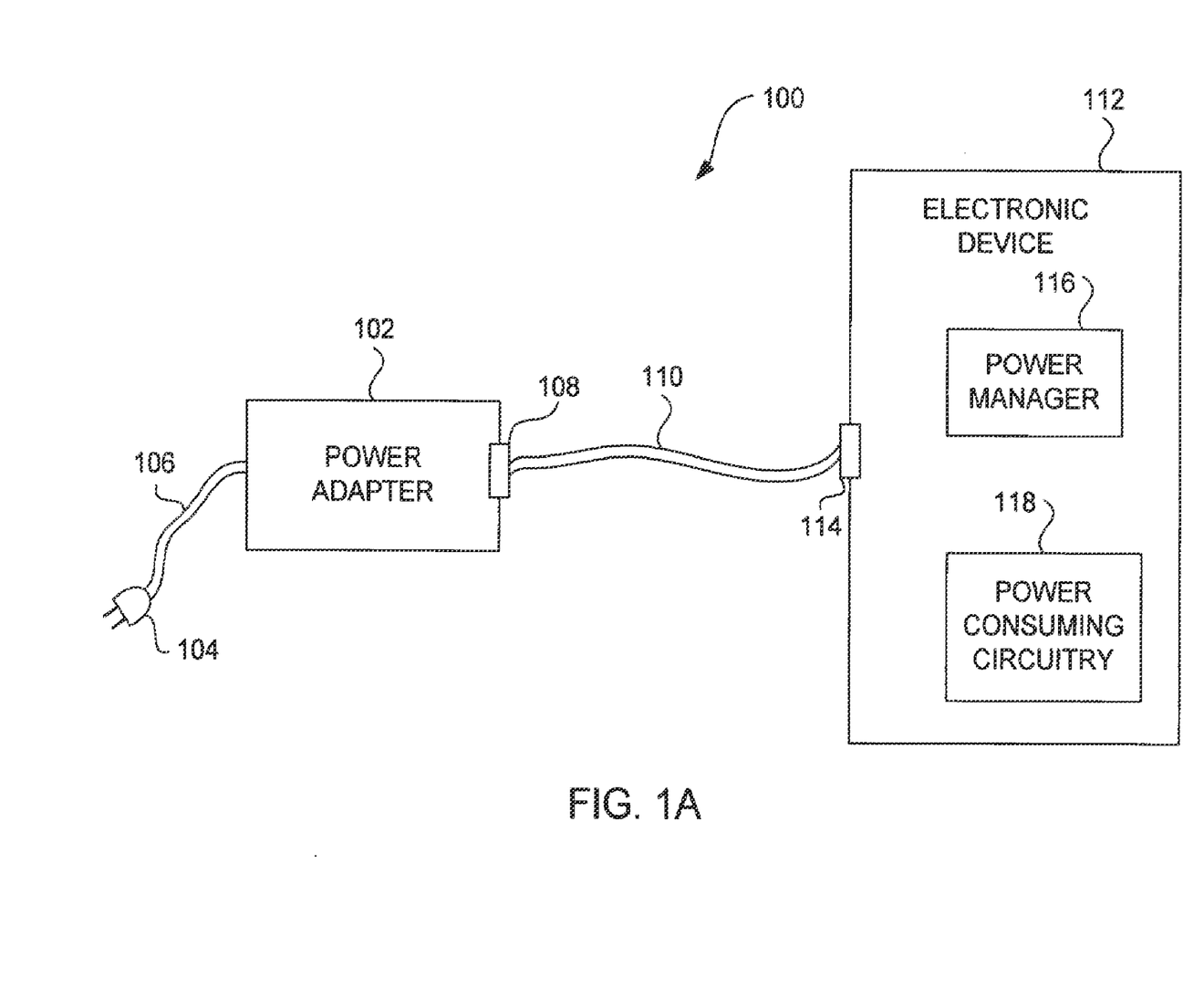
FIG. 1A is a block diagram of a power delivery system according to one embodiment of the invention.

FIG. 1A is a block diagram of a power delivery system 100 according to one embodiment of the invention. The power delivery system 100 includes a power adapter 102. The power adapter 102 can couple to an alternating current (AC) outlet by way of an AC plug 104 and a power cord 106. When so connected, AC power is supplied to the power adapter 102 from the AC outlet via the AC plug 104 and the power cord 106. Within the power adapter 102, the AC power is converted to direct current (DC) power. The DC power is coupled to a peripheral connector 108 of the power adapter 102 so that the DC power is available for use by other devices. In one embodiment, the peripheral connector 108 can be a Universal Serial Bus (USB) connector. In another embodiment, the peripheral connector 108 can be a FIREWIRE™ connector.

The peripheral connector 108 can receive a counterpart connector of one end of a peripheral cable 110. The peripheral cable 110 is used to provide the DC power from the peripheral connector 108 of the power adapter 102 to an electronic device 112. Hence, the opposite end of the peripheral cable 110 has a counterpart connector that couples to a peripheral connector 114 of the electronic device 112. The electronic device 112, in this embodiment, receives the DC power made available by the power adapter 102 via the peripheral cable 110. Here, the power adapter 102 can be considered a host device, at least for power, and the other devices that receive the power via the peripheral connector 108 can be considered peripheral devices, at least for power.

The DC power supplied to the electronic device 112 by the peripheral cable 110 can be consumed by the electronic device 112. However, the power adapter 102 is designed to provide only a certain, limited amount of power. Hence, proper design of the electronic circuit 112 would dictate that the electronic circuit 112 respect the certain, limited amount of power made available by the power adapter 102. This is complicated by the fact that the electronic device 112 can operate with various different power adapters that provide different limited amounts of power. Nevertheless, to avoid the electronic device 112 from over-consuming the amount of power available from the power adapter 102, the electronic device 112 includes a power manager 116. The power manager 116 can operate power consuming circuitry 118 within the electronic device 112 such that the available power from the power adapter 102 is not over-consumed. Hence, the operation of the electronic device 112 remains stable even when connected to different power adapters that provide different limited amounts of power. As an example, the power manager 116 can disable, limit or sequence usage of various circuits of the power consuming circuitry 118 such that the power being consumed is normally not more than the certain, limited amount of power made available by the power adapter 102. A battery can be provided within the electronic device 112 to provide power when the power adapter 102 is not connected, or can provide supplemental power (should it be needed) when the power adapter 102 is connected.

Figure 1B:
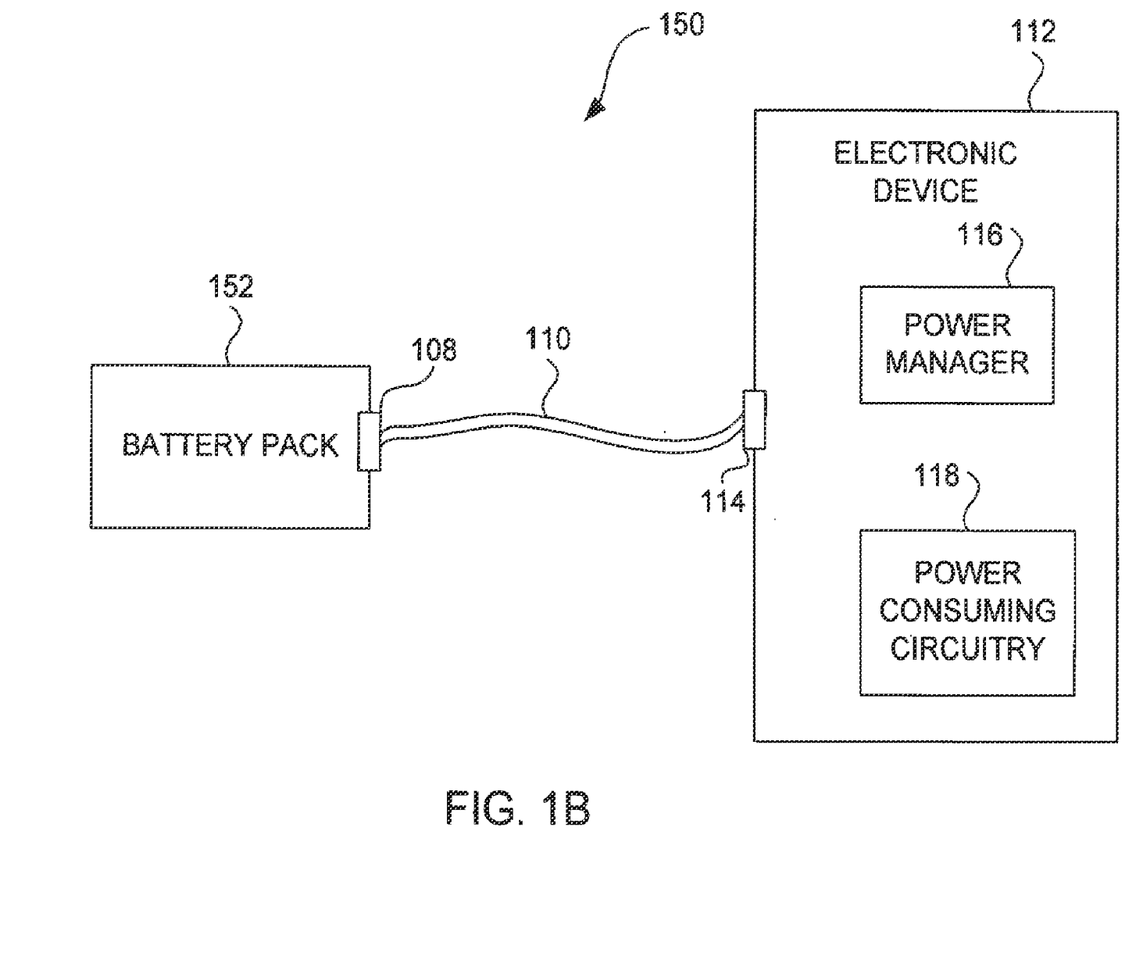
FIG. 1B is a block diagram of a power delivery system according to another embodiment of the invention.

FIG. 1B is a block diagram of a power delivery system 150 according to another embodiment of the invention. The power delivery system 150 is generally similar to the power delivery system 100 shown in FIG. 1A except that the power adapter 102 is replaced by a battery pack 150. The battery pack 150 provides direct current (DC) power. The peripheral cable 110 is used to provide the DC power from the battery pack 150 to the electronic device 112. The DC power supplied to the electronic device 112 by the peripheral cable 110 can be consumed by the electronic device 112. However, like the power adapter 102 of FIG. 1A, the battery pack 150 is designed to provide only a certain, limited amount of power. Hence, proper design of the electronic circuit 112 would dictate that the electronic circuit 112 respect the certain, limited amount of power made available by the battery pack 152. However, the power available from the battery pack 150 is dependent on the type and quantity of batteries provided in the battery pack 150. The power manager 116 can operate power consuming circuitry 118 within the electronic device 112 such that the available power from the battery pack 152 is not over-consumed. Hence, the operation of the electronic device 112 remains stable even when connected to different battery packs that provide different limited amounts of power. As an example, the power manager 116 can disable, limit or sequence usage of various circuits of the power consuming circuitry 118 such that the power being consumed is normally not more than the certain, limited amount of power made available by the battery pack 152. A battery can be provided within the electronic device 112 to provide power when the battery pack 152 is not connected, or can provide supplemental power (should it be needed) when the battery pack 152 is connected.

Figure 2A:
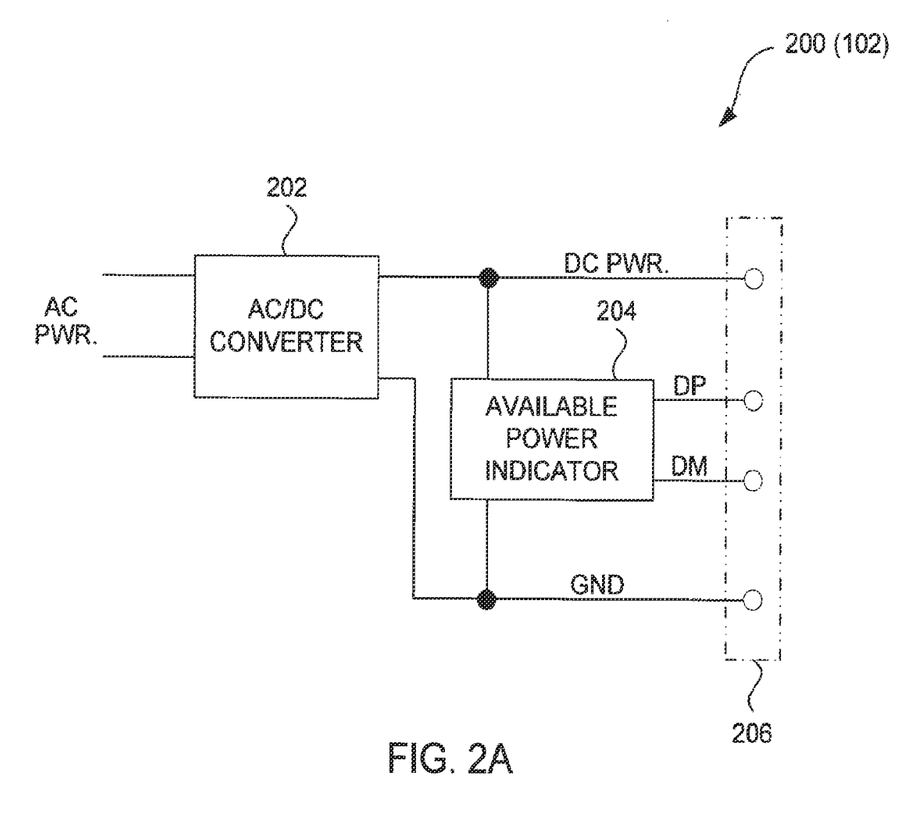
FIG. 2A is a block diagram of a power adapter according to one embodiment of the invention.

FIG. 2A is a block diagram of a power adapter 200 according to one embodiment of the invention. The power adapter 200 is, for example, suitable for use as the power adapter 102 illustrated in FIG. 1A.

The power adapter 200 includes an AC/DC converter 202 and an available power indicator 204. For example, as shown in FIG. 1A, the AC/DC converter 202 can receive AC power from the AC outlet via the AC plug 104 and the power cord 106. The AC power is then converted to DC power by the AC/DC converter 202. The DC power is then coupled to a power line of a peripheral connector 206. A ground line is also coupled to the peripheral connector 206. The available power indicator 204 also couples to the DC power and the ground line. The available power indicator 204 provides an available power indication. The available power indication indicates the amount of available power offered by the power adapter 200. The available power indication provided by the available power indicator 204 is coupled to data lines of the peripheral connector 206, such as data lines DP and DM shown in FIG. 2A.

The available power indicator 204 can be implemented in a variety of different ways. In one embodiment, the available power indicator 204 couples analog voltage levels to the data lines DP and DM of the peripheral connector 206. The voltages levels can be used to indicate the available power provided by the power adapter 200. The voltage levels on the data lines can be used directly or in a differential manner. In another embodiment, signaling could be utilized over the data lines. The signaling could pertain to a digital signal or could pertain to signals using a frequency or pulse-width modulation scheme.

Figure 2B:
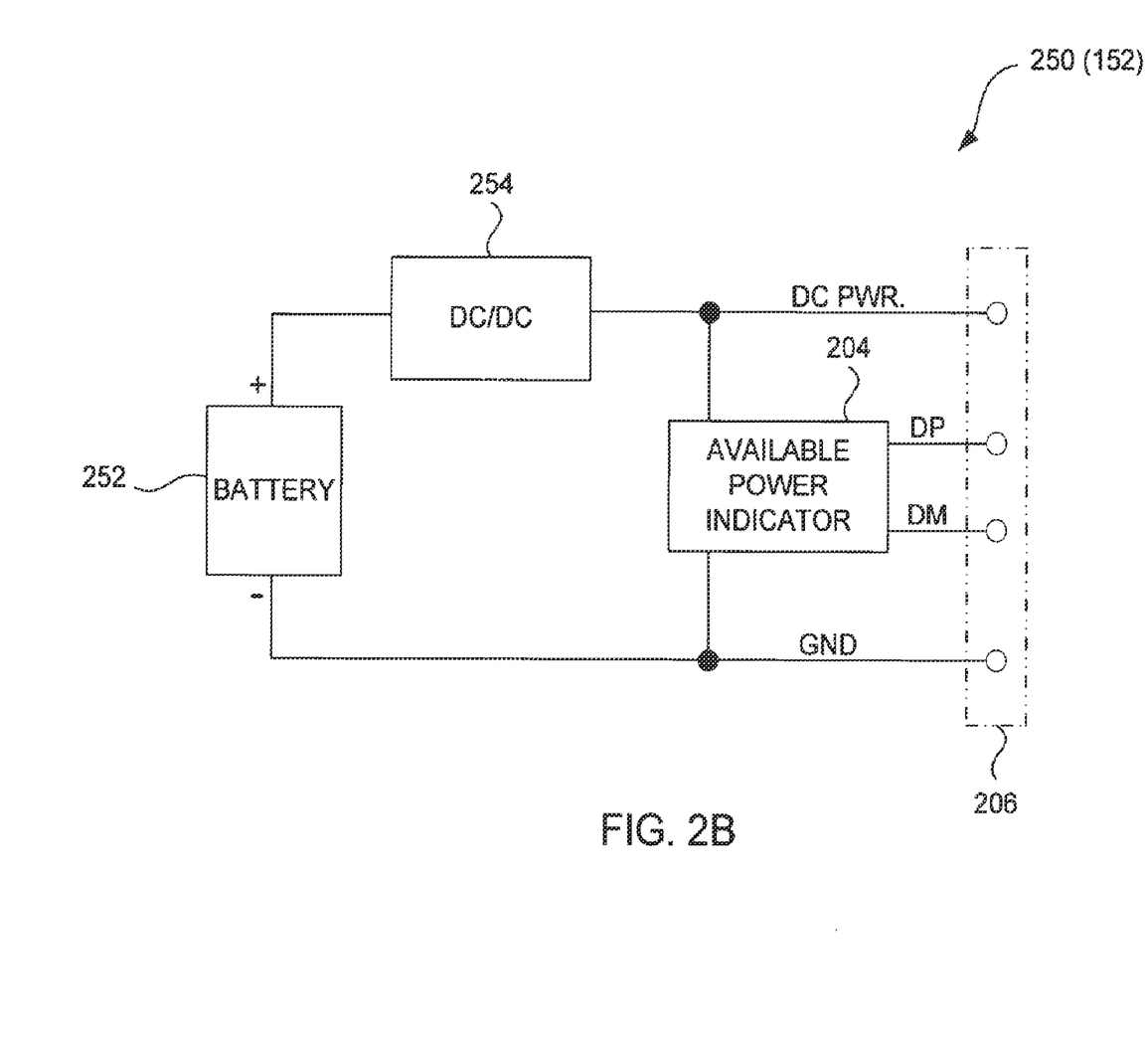
FIG. 2B is a block diagram of a battery pack according to one embodiment of the invention.

FIG. 2B is a block diagram of a battery pack 250 according to one embodiment of the invention. The battery pack 250 is, for example, suitable for use as the battery pack 152 illustrated in FIG. 1B.

The battery pack 250 includes one or more batteries 252 and a DC/DC regulator 254. The DC/DC regulator operates to regulate the DC power provided by the one or more batteries 252. The battery pack 250 also includes the available power indicator 204. The DC power is then coupled to a power line of a peripheral connector 206. A ground line is also coupled to the one or more batteries 252 and the peripheral connector 206. As noted above, the available power indicator 204 provides an available power indication. In this embodiment, the available power indication indicates the amount of available power offered by the battery pack 250. The available power indication provided by the available power indicator 204 is coupled to data lines of the peripheral connector 206, such as data lines DP and DM shown in FIG. 2B.

Figure 3A:
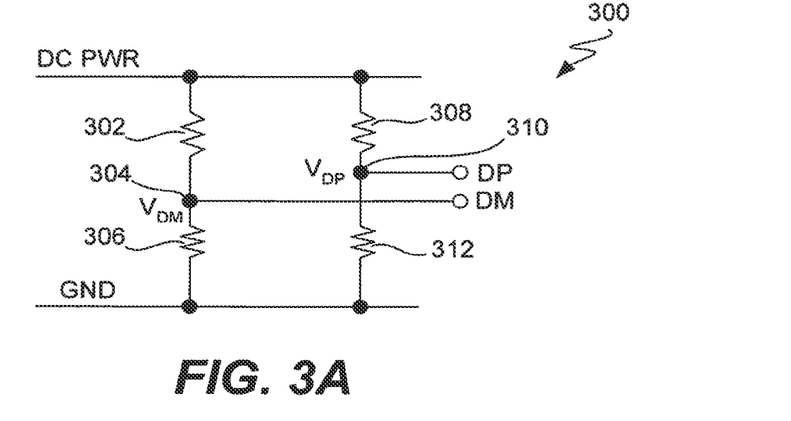
FIG. 3A is a schematic diagram of a resistor arrangement according to one embodiment of the invention.
Figure 3B:
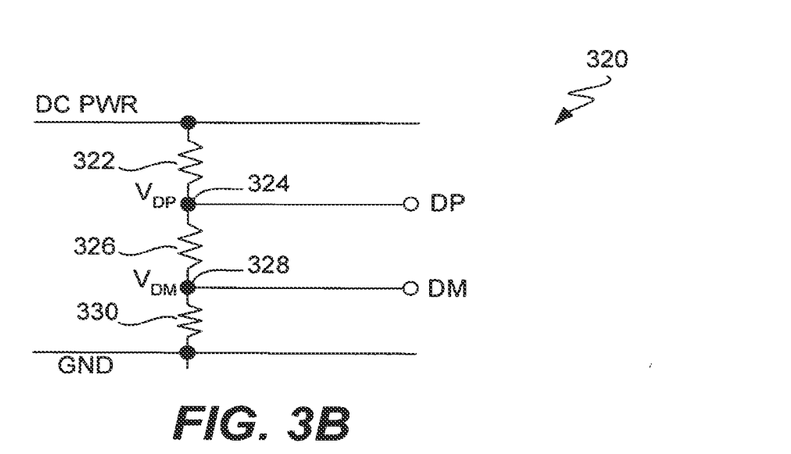
FIG. 3B illustrates a resistor arrangement according to another embodiment of the invention.
Figure 3C:
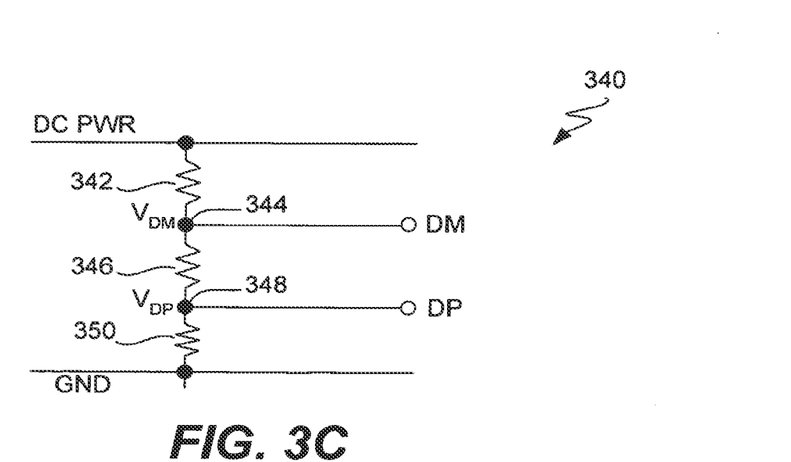
FIG. 3C illustrates a resistor arrangement according to another embodiment of the invention.

When the available power indicator 204 is implemented to apply analog voltage levels to the data lines DP and DM, the available power indicator 204 can be implemented by a resistor arrangement. FIGS. 3A-3C illustrate different representative resistor arrangements that can be utilized to implement the available power indicator 204 according to certain embodiments of the invention.

FIG. 3A is a schematic diagram of a resistor arrangement 300 according to one embodiment of the invention. The resistor arrangement 300 includes a first resistor 302 coupled between DC power (DC PWR) and a first node 304. A second resistor 306 is coupled between the first node 304 and ground (GND). A third resistor 308 is coupled between DC power and a second node 310. A fourth resistor 312 is coupled between the second node 310 and ground. The data line DP is coupled to the second node 310, and the data line DM is coupled to the first node 304. Hence, the voltage $V_{DP}$ which appears at the second node 310 is placed on the data line DP, and the voltage $V_{DM}$ which appears at the first node 304 is placed on the data line DM.

FIG. 3B illustrates a resistor arrangement 320 according to another embodiment of the invention. The resistor arrangement 320 includes a first resistor 322 coupled between DC power and a first node 324. A second resistor 326 is coupled between the first node 324 and a second node 328. A third resistor 330 is coupled between the second node 328 and ground. The data line DP is coupled to the first node 324 so as to place a voltage $V_{DP}$ on the data line DP. The data line DM is coupled to the second node 328 to supply the voltage $V_{DM}$ on the data line DM.

FIG. 3C illustrates a resistor arrangement 340 according to another embodiment of the invention. A first resistor 342 is coupled between DC power and a first node 344. A second resistor 346 is coupled between the first node 344 and a second node 348. A third resistor 350 is coupled between the second node 348 and ground. The data line DM is coupled to the first node 344 to supply the voltage $V_{DM}$ to the data line DM. The data line DP is coupled to the second node 348 to supply the voltage $V_{DP}$ to the data line DP.

It should be noted that the voltages being coupled to the data lines DP and DM can be used directly or in a differential manner. For example, a differential voltage could be utilized, such as, $V_{DPM}=V_{DP}-V_{DM}$. The advantage of using a differential voltage is that the number of gradations of available power levels that can be detected is increased (e.g., doubled). It should also be noted that the resistor arrangement 320 in FIG. 3B guarantees that the voltage $V_{DP}$ is always going to be greater than the voltage $V_{DM}$. In contrast, the resistor arrangement 340 in FIG. 3C guarantees that the voltage $V_{DM}$ is always going to be greater than the voltage $V_{DP}$. Hence, the resister arrangements 320 and 340 are particularly well suited with the differential voltage approach.

According to one embodiment of the invention, the voltages $V_{DP}$ and $V_{DM}$ appearing on the data lines DP and DM, respectively, are always going to be considered "High" by the electronic device 112. That is, these voltage levels will be greater than the minimum high level voltage that is used to determine whether the voltage at the data line is "High" or "Low". Hence, although these voltages are "High," the voltages can exceed the minimum high level by different amounts so as to provide gradations of high level voltages. These different gradations can be utilized to signal to the electronic device 112 the particular amount of available power offered by the power adapter 102.

Figure 4A:
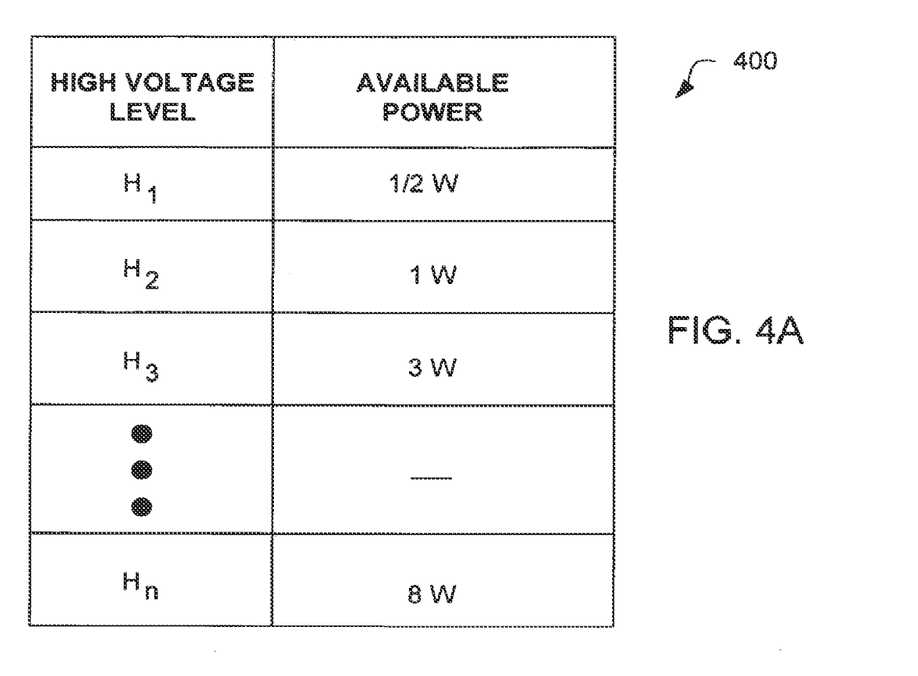
FIG. 4A illustrates a table that provides a representative correlation of high voltage level to available power.

FIG. 4A illustrates a table 400 that provides a representative correlation of high voltage level to available power. As shown in the table 400 illustrated in FIG. 4A, a high voltage level $H_1$ can indicate that the corresponding power source can supply 0.5 Watts of available power. The power source can be a power adapter or a battery pack. A high voltage level $H_2$ can indicate that the corresponding power source can supply 1 Watt of available power. A high voltage level $H_3$ can indicate that the corresponding power source can supply 3.0 Watts of available power. Additionally, in general, the $n^{th}$ high voltage level ($H_n$) can indicate that the corresponding power source can supply 8.0 Watts of available power. Although the high voltage levels $H_1, H_2, H_3, \ldots, H_n$ can vary depending upon implementation, these voltage levels are all "High" level. For example, if the peripheral bus deems voltages from 2.0-3.3 Volts as "High," then the high voltage levels $H_1, H_2, H_3, \ldots, H_n$ represent distinct, non-overlapping voltages or voltage ranges all within the range of 2.0 Volts and 3.3 Volts.

Figure 4B:
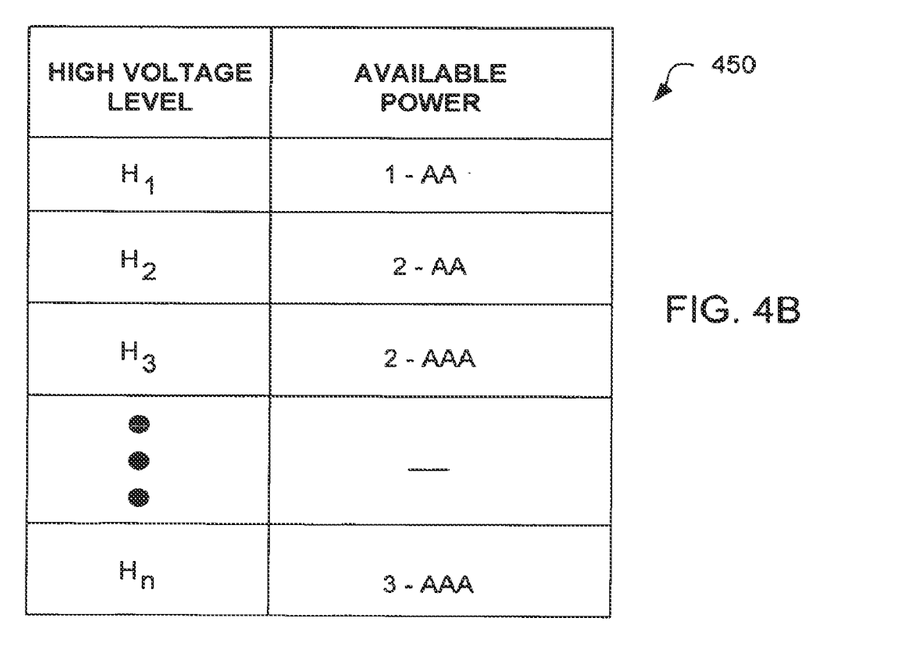
FIG. 4B illustrates a table that provides a representative correlation of high voltage level to available power.

FIG. 4B illustrates a table 450 that provides a representative correlation of high voltage level to available power. The table 450 is suitable for use when the power source is a battery pack. The table 450 can indicate characteristics of the battery pack, which indirectly provide an indication of available power. As shown in the table 450 illustrated in FIG. 4B, a high voltage level $H_1$ can indicate that the corresponding battery pack has one AA battery. A high voltage level $H_2$ can indicate that the corresponding battery pack has two AA batteries. A high voltage level $H_3$ can indicate that the corresponding battery pack has two AAA batteries. Additionally, in general, the $n^{th}$ high voltage level ($H_n$) can indicate that the corresponding battery pack has three AAA batteries. Although the high voltage levels $H_1, H_2, H_3, \ldots, H_n$ can vary depending upon implementation, these voltage levels are all "High" level.

In other embodiments, the sign (positive or negative) of the voltage difference (e.g., $V_{DPM}=V_{DP}-V_{DM}$) can be used to distinguish different power sources. For example, if the voltage difference is positive, the power source can be deemed a power adapter. Alternatively, if the voltage difference is negative, the power source can be deemed a battery pack. The magnitude of the voltage difference can then be used as noted above to directly or indirectly signify level of power availability.

Figure 5:
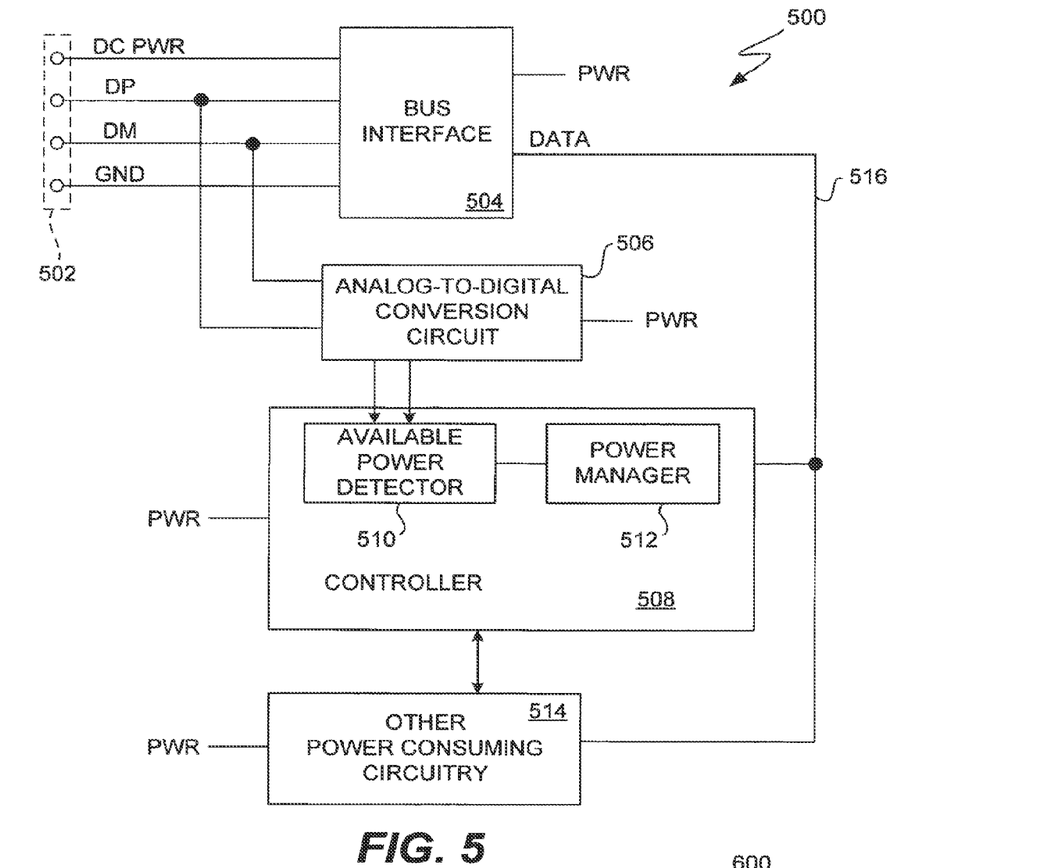
FIG. 5 is a block diagram of an electronic device according to one embodiment of the invention.

FIG. 5 is a block diagram of an electronic device 500 according to one embodiment of the invention. The electronic device 500 can, for example, represent the electronic device 112 illustrated in FIGS. 1A and 1B.

The electronic device 500 couples to or includes a peripheral connector 502. The peripheral connector 502 is coupled to a DC power (DC PWR) line, a data DP line, a data DM line, and a ground (GND) line. These lines are supplied to a bus interface 504. The bus interface 504 enables the electronic device 500 to receive power and/or participate in data transmissions and receptions over a peripheral bus. Since the invention is primarily concerned with receiving power over the peripheral bus, the discussion below is primarily directed to receiving power at the electronic device 500 over the peripheral bus and then managing power utilization to ensure stable operation.

The electronic device 500 further includes an analog-to-digital conversion circuit 506. The analog-to-digital conversion circuit 506 couples to the data lines DP and DM. The analog-to-digital conversion circuit 506 converts the analog voltage levels on the data lines DP and DM to digital voltage levels that are supplied to a controller 508. More particularly, the digital voltage levels are supplied to an available power detector 510. In this embodiment, the available power detector 510 is provided within the controller 508. For example, the controller 508 is typically an integrated circuit, such as a microprocessor, custom IC (e.g., ASIC), or programmable IC that has been programmed. The available power detector 510 examines the digital voltage levels to determine an available power level. The available power level represents an amount of available power that is available to the electronic device 500 from a power source via the peripheral bus. Once the available power level is determined, the available power level is provided to a power manager 512. In this embodiment, the power manager 512 is provided within the controller 508. The power manager 512 operates to control the operational activity of the electronic device 500 so that its power draw via the peripheral bus does not normally exceed the power available from the power source. In this regard, the power manager 512 may cause the controller 508 or other power consuming circuitry 514 to defer operations, sequence operations, or avoid operations so that the power consumption of the electronic device 500 is managed.

Typically, the electronic device 500 would be a battery-powered device and that a rechargeable battery within the electronic device 500 could be charged by the power provided over the peripheral bus. Hence, the charging operation may affect the amount of power available for other circuitry within the electronic device 500. Furthermore, to the extent that the battery is adequately charged, the battery may offer additional power for consumption by the electronic device 500 in the event that the available power offered by the power source via the peripheral bus is exceeded by operational activity of the electronic device 500. Examples of the other power consuming circuitry 514 will vary widely depending upon implementation. Nevertheless, some examples of other power consuming circuitry 514 include a disk drive, a battery charge circuit, a memory device (e.g., RAM, ROM), a battery monitor, and a display.

In the embodiment of the electronic device 500 shown in FIG. 5, the available power detector 510 and the power manager 512 are provided within the controller 508. However, it should be recognized that the available power detector 510 and the power manager 512 need not be provided within the controller 508 and can also be separate components or integrated together.

Figure 6:
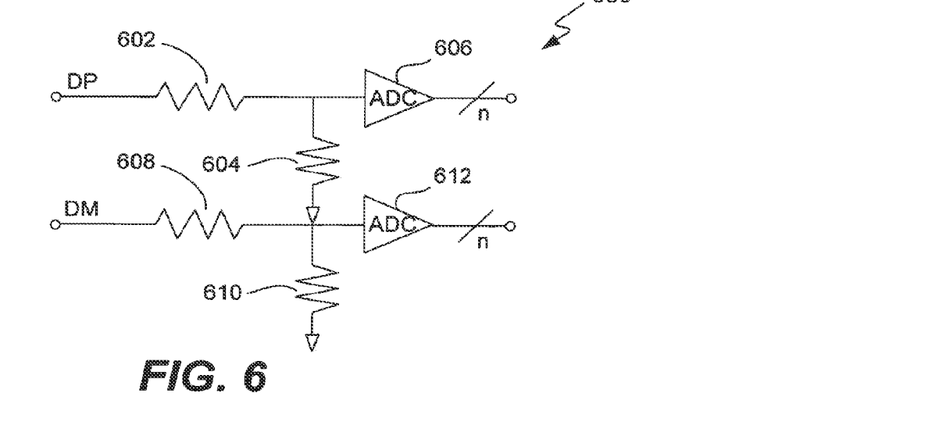
FIG. 6 is a schematic diagram of an analog-to-digital conversion circuit according to one embodiment of the invention.

FIG. 6 is a schematic diagram of an analog-to-digital conversion circuit 600 according to one embodiment of the invention. The analog-to-digital conversion circuit 600 is, for example, suitable for use as the analog-to-digital conversion circuit 506 illustrated in FIG. 5. The analog-to-digital conversion circuit 600 includes resistors 602 and 604 and an analog-to-digital converter (ADC) 606 for converting an analog voltage on the data line DP to a digital output of n-bits.

Similarly, resistors 608 and 610 and an ADC 612 convert an analog voltage on the data line DM to a digital output of n-bits.

In an alternate embodiment for the analog-to-digital conversion circuit 506 illustrated in FIG. 5, the conversion circuitry could be shared for the data lines DP and DM through use of a switch or multiplexer and only a portion of the analog-to-digital conversion circuit 600. For example, a switch or multiplexer could selectively couple one of the data line DM or DP to the resistor 602, and then the output of the ADC 606 can be the digital voltage on the data line DM or on the data line DP, thus eliminating the need for the resistors 608 and 610 as well as the ADC 612.

Figure 7:
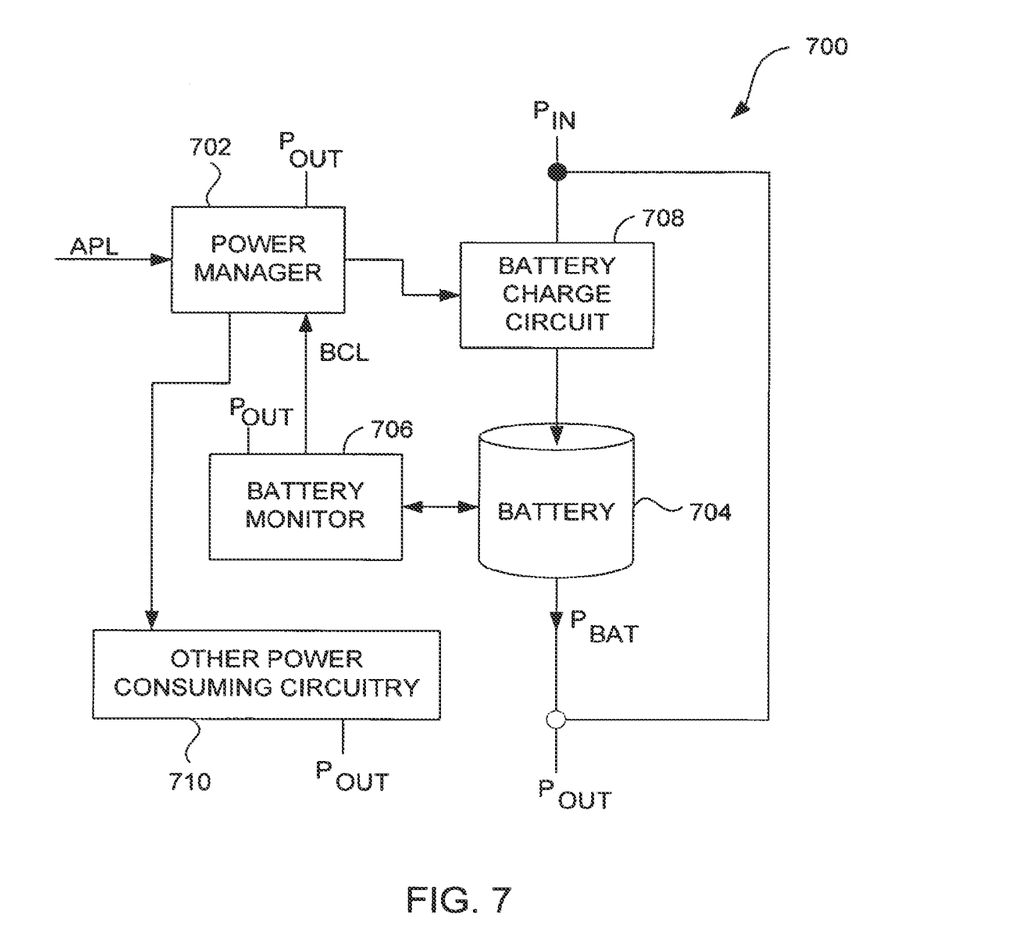
FIG. 7 is a block diagram of a power management system according to one embodiment of the invention.

FIG. 7 is a block diagram of a power management system 700 according to one embodiment of the invention. The power management system 700 describes a representative operation of a power manager, such as the power manager 512, according to one embodiment of the invention. The power management system 700 represents a portion of an electronic device.

The power management system 700 includes a power manager 702. The power manager 702 receives an available power level (APL) from an available power detector, such as the available power detector 510. The power manager 702 operates to control operation of electronic circuitry based on the available power level. As shown in FIG. 7, the power management system 700 can couple to a battery 704 and a battery monitor 706. The battery monitor 706 can monitor a battery charge level (BCL) and provide the battery charge level to the power manager 702. As a result, the power manager 702 can also control operation of electronic circuitry based on the battery charge level. In other words, the power manager 702 can manage power consumption by the electronic device based on the available power level and/or the battery charge level.

Power supplied to the electronic device by the power source can be coupled to the battery 704 via a battery charge circuit 708. The battery charge circuit 708 can be controlled by the power manager 702 such that the power available from a power source can either be available for charging the battery 704 or can be prevented from being used to charge the battery 704. The power management system 700 also includes other power consuming circuitry 710 associated with the electronic device. The other power consuming circuitry 710 can vary widely depending upon implementation. Nevertheless, some or all of the power consuming circuitry 710 can be controlled by the power manager 702. For example, the power manager 702 could limit the use of certain circuitry, could cause circuitry too initiate in different sequences, could change usage of circuitry, etc. In doing so, the power manager 702 can make use of not only the available power level but also the battery charge level. As shown in FIG. 7, power from the battery $P_{BAT}$ is combined with the power from the power source $P_{IN}$ to yield a device power $P_{OUT}$. The device power $P_{OUT}$ is provided to at least the power manager 702, the battery monitor 706, and the other power consuming circuitry 710. Hence, even though power consumption is being managed by the power manager 702, the power being drawn from the electronic device can exceed the power into the electronic device by the power amplifier, namely, power $P_{IN}$, provided the difference in power is available from the battery $P_{BAT}$.

Figure 8:
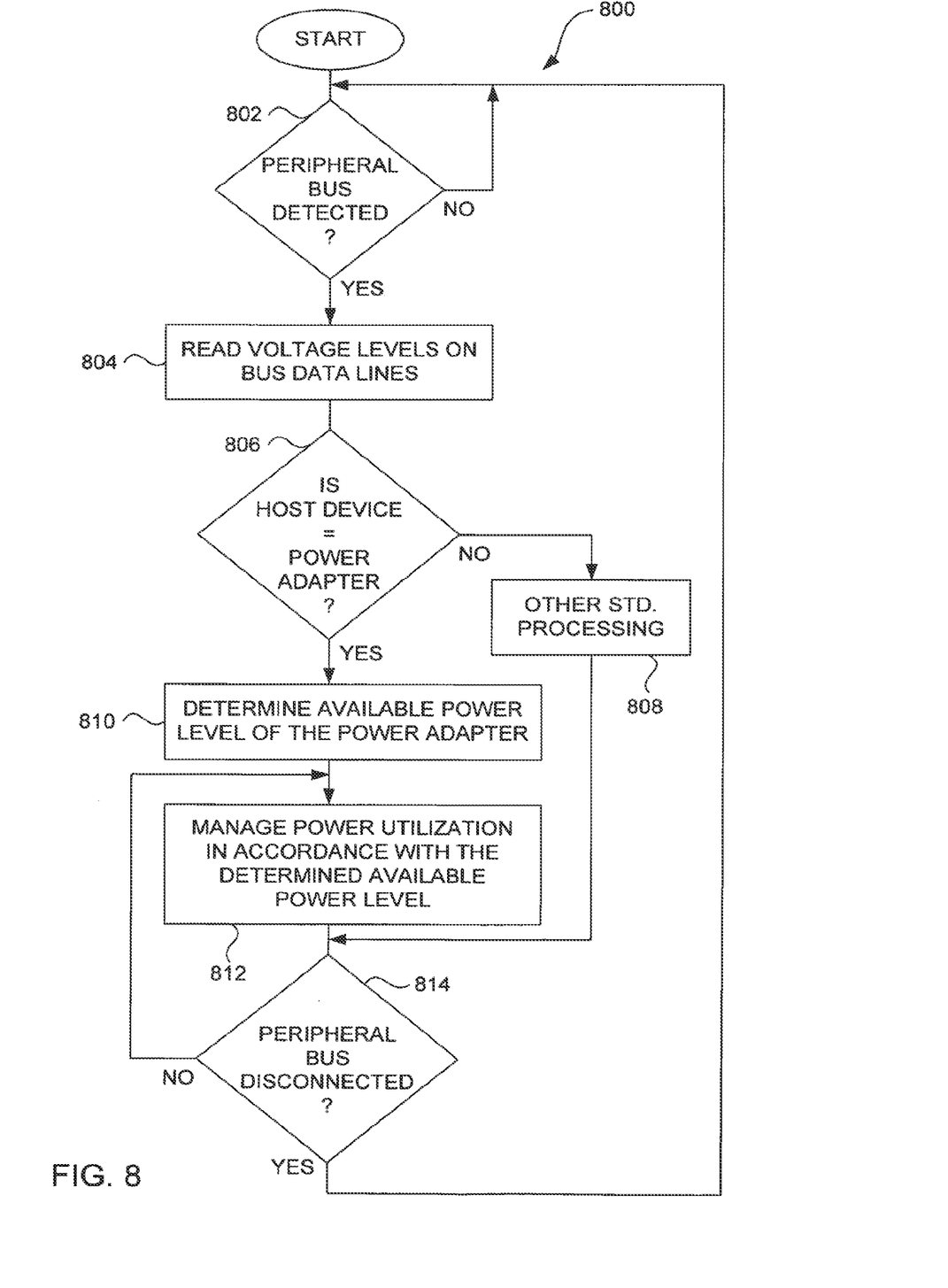
FIG. 8 is a flow diagram of an available power process according to one embodiment of the invention.

FIG. 8 is a flow diagram of an available power process 800 according to one embodiment of the invention. The available power process 800 is, for example, performed by an electronic device, such as the electronic device 112 illustrated in FIGS. 1A and 1B or the electronic device illustrated in FIG. 5.

The available power process 800 begins with a decision 802 that determines whether a peripheral bus has been detected. Here, the electronic device can monitor or be informed when a peripheral bus is coupled between a host and the electronic device. In one embodiment, once a power line (e.g., DC PWR) of a peripheral connector of the electronic device detects the presence of a positive voltage source (e.g., 5 volts) the presence of a peripheral bus can be deemed detected by the electronic device. When the decision 802 determines that a peripheral bus has not been detected, the available power process 800 waits for the detection of a peripheral bus. In other words, the available power process 800 can be initiated or deemed invoked once the peripheral bus has been detected.

Once the decision 802 determines that a peripheral bus has been detected, voltage levels are read 804 from bus data lines of the peripheral bus. For example, the voltage levels can be read from the data lines DP and DM, such as illustrated in FIG. 5. Next, a decision 806 determines whether the host device is a power source. The peripheral bus being detected can be from various different devices (e.g., host devices), including a power source and a computer. In one embodiment, the voltage levels on the bus data lines can signal the type of host device. For example, the invention is particularly suited for use with host devices that are power sources. More particularly, the voltage levels on the bus data lines can signal that the host device is a power source. In one implementation, the voltage levels being "High" on the bus data lines can signal the presence of a power source.

In any case, when the decision 806 determines that the host device is not a power source, then other standard processing 808 can be performed. For example, if the host device is a computer, the other standard processing 808 may involve operations to facilitate the exchange of data between the computer and the electronic device.

On the other hand, when the decision 806 determines that the host device is a power source, an available power level of the power source is determined 810. In one embodiment, the available power level of the power source can be determined 810 by further examination of the voltage levels on the bus data lines. Namely, the voltage levels on the bus data lines can signal the power level available from the power source. For example, as noted above with respect to FIG. 4A, the voltage levels on the bus data lines can be categorized into a plurality of "High" voltage levels $H_1, H_2, H_3, \ldots, H_n$ which are deemed to respectively correspond to different available power levels offered by the power source, namely, 0.5, 1, 3, . . . , 8 Watts.

After the available power level is determined 810, power utilization by the electronic device can be managed 812 in accordance with the determined available power level. That is, during operation of the electronic device, the power utilization can be controlled or managed such that operations or functions may vary depending upon the determined available power level.

Next, followings blocks 808 and 812, a decision 814 determines whether the peripheral bus has been disconnected. When the decision 814 determines that the peripheral bus has not been disconnected, then the processing returns to repeat the decision 812 so that power utilization by the electronic device can continue to be managed. Alternatively, when the decision 814 determines that the peripheral bus has been disconnected, the processing returns to repeat the decision 802 and subsequent blocks so that the electronic device can again perform the available power process 800 when a peripheral bus is thereafter connected to the electronic device.

One type of operation that is particularly power intensive is a boot process, which involves the initial start-up of an electronic device. Typically, the electronic device performing a boot process would include a disk drive device that stores program code that is used for or to boot-up an operating system for the electronic device.

Figure 9:
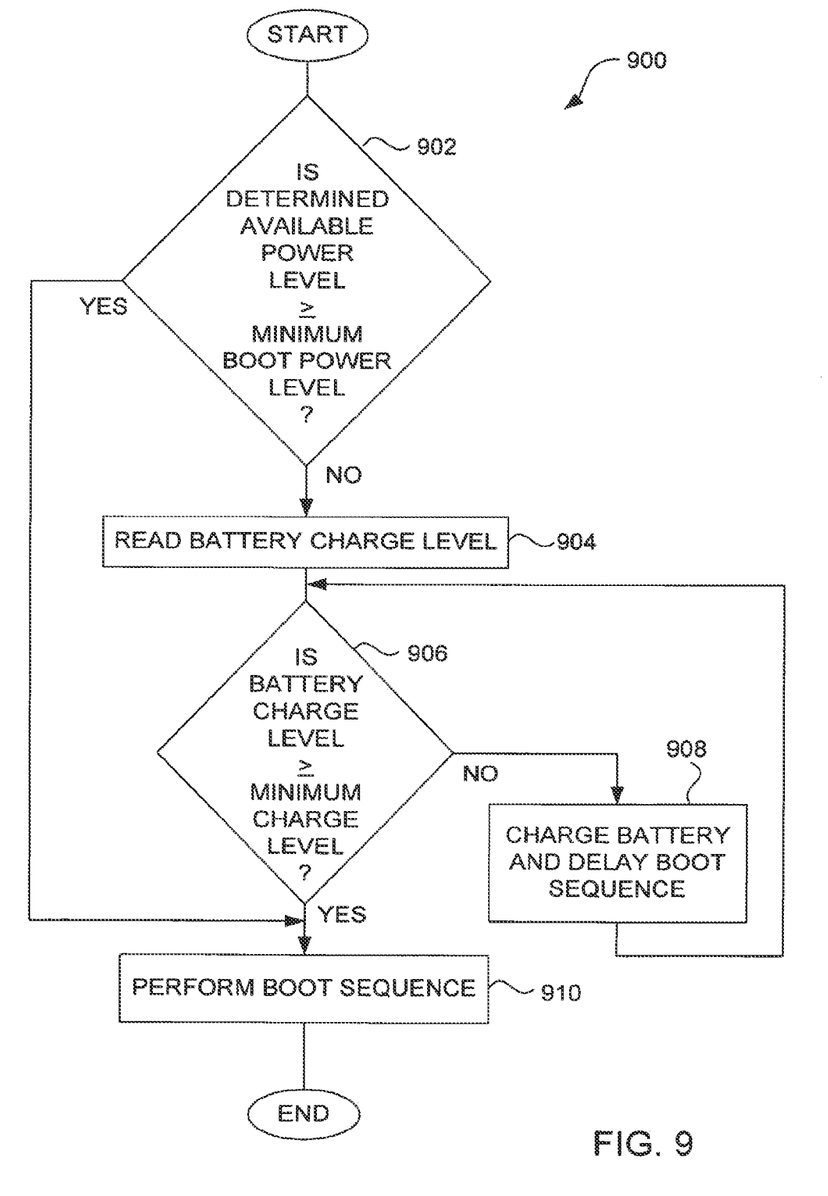
FIG. 9 is a flow diagram of a boot process according to one embodiment of the invention.

FIG. 9 is a flow diagram of a boot process 900 according to one embodiment of the invention. The electronic device can perform the boot process 900 to initiate the electronic device for operation.

The boot process 900 begins with a decision 902 that determines whether the determined available power level is greater than or equal to a minimum boot power level. As an example, the determined available power level can be determined at block 810 of the available power process illustrated in FIG. 8. When the decision 902 determines that the determined available power level (from the power source) is not greater than or equal to the minimum boot power level, then further processing is performed to determine whether its is an appropriate time to boot-up. More specifically, a battery charge level is read 904. Then, a decision 906 determines whether the battery charge level is greater than or equal to a minimum charge level. When the decision 906 determines that the battery charge level is not greater than or equal to the minimum charge level, the battery is charged 908 and a boot sequence is delayed. Following the block 908, the boot process 900 returns to repeat the decision 906 so that the battery charge level can again be compared with the minimum charge level. Once the decision 906 determines that the battery charge level equals or exceeds the minimum charge level, then the boot process 900 permits the boot sequence to be performed 910.

On the other hand, when the decision 902 determines that the determined available power level is greater than or equal to the minimum boot power level, the boot sequence can be directly performed 910. Accordingly, the boot process 900 permits the boot sequence to be immediately performed if the determined available power level offered by the power source is deemed to exceed the minimum boot power level needed to properly operate the electronic device during the boot sequence. However, in the case in which the determined available power level offered by the power source does not equal or exceed the minimum boot power level, additional power may be required to be drawn from the battery of the electronic device. Hence, the decision 906 ensures that the battery has at least a minimum charge level before the boot sequence is able to be performed 910. Following the performance 910 of the boot sequence, the boot process 900 is complete and ends.

The electronic device as described herein can be a media player capable of playing (including displaying) media items. The media items can pertain to audio items (e.g., audio files or songs), videos (e.g., movies) or images (e.g., photos).

Figure 10:
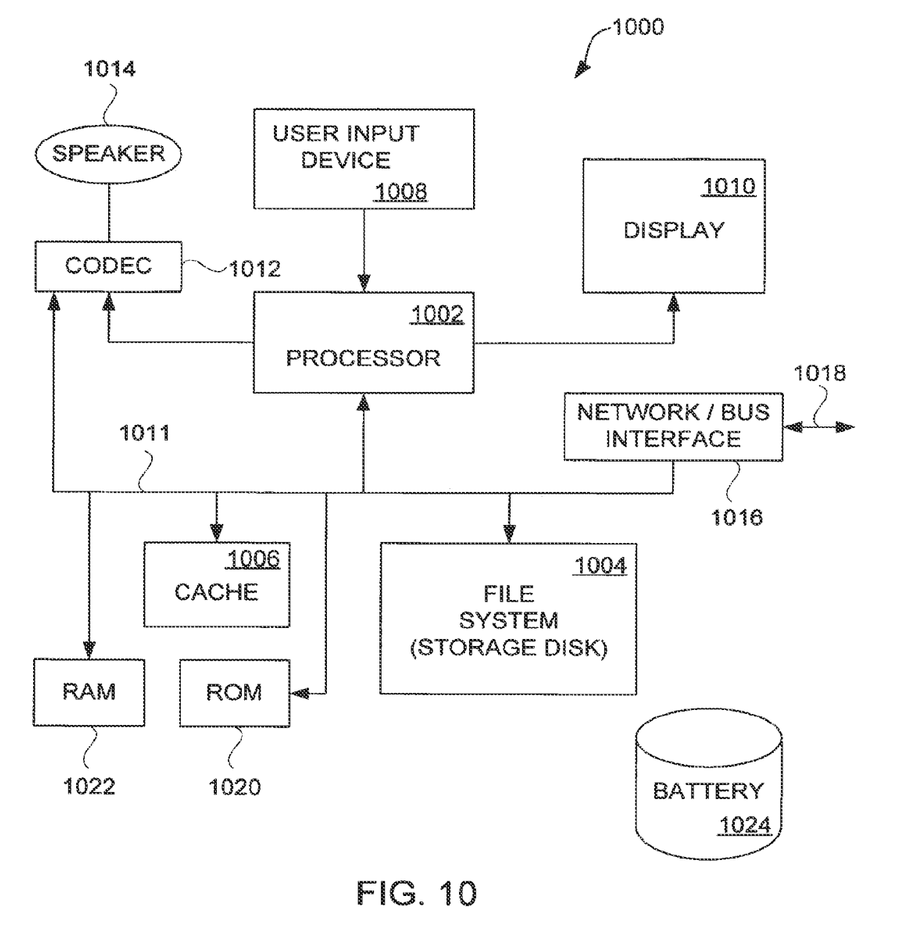
FIG. 10 is a block diagram of a media player suitable for use with the invention.

FIG. 10 is a block diagram of a media player 1000 suitable for use with the invention. The media player 1000 can include the circuitry of the electronic device 112 in FIGS. 1A and 1B or the electronic device 500 in FIG. 5, and/or can perform the operations described with reference to FIGS. 8 and 9.

The media player 1000 includes a processor 1002 that pertains to a microprocessor or controller for controlling the overall operation of the media player 1000. The media player 1000 stores media data pertaining to media items in a file system 1004 and a cache 1006. The file system 1004 is, typically, a storage disk or a plurality of disks. The file system 1004 typically provides high capacity storage capability for the media player 1000. However, since the access time to the file system 1004 is relatively slow, the media player 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the media player 1000 is a portable media player that is powered by a battery (not shown). The media player 1000 also includes a RAM 1020 and a Read-Only Memory (ROM) 1022. The ROM 1022 can store programs, utilities or processes to be executed in a non-volatile manner. The RAM 1020 provides volatile data storage, such as for the cache 1006.

The media player 1000 also includes a user input device 1008 that allows a user of the media player 1000 to interact with the media player 1000. For example, the user input device 1008 can take a variety of forms, such as a button, keypad, dial, etc. Still further, the media player 1000 includes a display 1010 (screen display) that can be controlled by the processor 1002 to display information to the user. A data bus 1011 can facilitate data transfer between at least the file system 1004, the cache 1006, the processor 1002, and the CODEC 1012.

In one embodiment, the media player 1000 serves to store a plurality of media items (e.g., songs) in the file system 1004. When a user desires to have the media player play a particular media item, a list of available media items is displayed on the display 1010. Then, using the user input device 1008, a user can select one of the available media items. The processor 1002, upon receiving a selection of a particular media item, supplies the media data (e.g., audio file) for the particular media item to a coder/decoder (CODEC) 1012. The CODEC 1012 then produces analog output signals for a speaker 1014. The speaker 1014 can be a speaker internal to the media player 1000 or external to the media player 1000. For example, headphones or earphones that connect to the media player 1000 would be considered an external speaker.

The media player 1000 also includes a bus interface 1016 that couples to a data link 1018. The data link 1018 allows the media player 1000 to couple to a host device (e.g., host computer or power source). The data link 1018 can also provide power to the media player 1000.

The various aspects, embodiments, implementations or features of the invention can be used separately or in any combination.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a portable media device can easily and rapidly determine whether a power source is connected to its peripheral port and, if so, how much power can be drawn from the power source via the peripheral port. Another advantage of the invention is that power utilization by a portable media device can be dependent on available power for stable and reliable operation.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A power source comprising:
a power line;
a ground line;
available power circuitry operatively coupled to the power line and the ground line, wherein the available power circuitry is configured to provide a first voltage on a first output and a second voltage on a second output, the first and second voltages indicating which level of power from a set of two or more different non-zero power levels is available from the power source; and
a connector including a power pin coupled to the power line, a ground pin coupled to the ground line, a first digital data pin coupled to the first output of the available power circuitry, and a second digital data pin coupled to the second output of the available power circuitry, wherein when the connector is coupled to a peripheral bus connector of an electronic device:
the power line is operable to provide power to a peripheral bus connector of an electronic device via the power pin, and
the first and second digital data pins are operable to provide the first and second voltages to respective digital data input pins of the peripheral bus connector of the electronic device.

2. The power source of claim 1, further comprising:
a plug connector for receiving AC current; and
an AC/DC converter having an input coupled to the plug connector and having outputs coupled with the power line and the ground line respectively.

3. The power source of claim 1, further comprising:
a battery having a positive terminal and a negative terminal, wherein the power line is coupled with the positive terminal of the battery and the ground line is coupled with the negative terminal of the battery.

4. The power source of claim 3, further comprising:
a DC/DC converter having an input coupled to the positive terminal and an output coupled to the power line.

5. The power source of claim 1, wherein the connector is a USB connector.

6. A method of providing power to a peripheral bus connector of an electronic device from a first connector of a power source, the method comprising:
providing power to the first connector of the power source using a power line and a ground line, wherein a power pin of the first connector is coupled to the power line and a ground pin of the first connector is connected to the ground line;
determining, with available power circuitry, at least two indicator voltages based on voltages on the power line and the ground line, the indicator voltages indicating which level of power from a set of two of more different non-zero power levels is available from the power source; and
providing respective indicator voltages from the available power circuitry to first and second digital data pins of the first connector;
when the first connector is coupled with the peripheral bus connector of the electronic device, providing the respective indicator voltages from the first and second digital data pins of the first connector to respective digital data input pins of the peripheral bus connector of the electronic device, thereby providing a level of power available to the electronic device from the power source.

7. The method of claim 6, further comprising:
receiving AC power at a plug connector; and
converting the AC power to DC power on the power line and the ground line.

8. The method of claim 6, further comprising:
providing power on the power and ground line with a battery having a positive terminal and a negative terminal, wherein the power line is coupled with the positive terminal of the battery and the ground line is coupled with the negative terminal of the battery.

9. The method of claim 8, further comprising:
converting the DC voltage of the battery to another DC voltage using a DC/DC converter having an input coupled to the positive terminal and an output coupled to the power line.

10. The method of claim 6, wherein the first connector is a USB connector.

11. A power source comprising:
a power line;
a ground line;
available power circuitry operatively coupled to the power line and the ground line, wherein the available power circuitry is configured to provide a first voltage on a first output and a second voltage on a second output, the first and second voltages indicating a level of power available from the power source, and wherein the first and second voltages are both at respective voltage gradations of a set of two or more voltage gradations above a minimum high voltage level; and
a connector including a power pin coupled to the power line, a ground pin coupled to the ground line, a first digital data pin coupled to the first output of the available power circuitry, and a second digital data pin coupled to the second output of the available power circuitry,
wherein when the connector is coupled to a peripheral bus connector of an electronic device:
the power line is operable to provide power to a peripheral bus connector of an electronic device via the power pin, and
the first and second digital data pins are operable to provide the first and second voltages to respective digital data input pins of the peripheral bus connector of the electronic device.

12. The power source of claim 11, wherein the voltage gradation above the minimum high voltage level that the first votlage is at is different than the voltage gradation above the minimum high voltage level that the second voltage is at.

13. The power source of claim 11, further comprising:
a plug connector for receiving AC current; and
an AC/DC converter having an input coupled to the plug connector and having outputs coupled with the power line and the ground line respectively.

14. The power source of claim 11, further comprising:
a battery having a positive terminal and a negative terminal, wherein the power line is coupled with the positive terminal of the battery and the ground line is coupled with the negative terminal of the battery.

15. The power source of claim 14, further comprising:
a DC/DC converter having an input coupled to the positive terminal and an output coupled to the power line.

16. The power source of claim 11, wherein the connector is a USB connector.

* * * * *